(12) United States Patent
Kuan et al.

(10) Patent No.: US 6,181,811 B1
(45) Date of Patent: Jan. 30, 2001

(54) METHOD AND APPARATUS FOR OPTIMIZING BIOLOGICAL AND CYTOLOGICAL SPECIMEN SCREENING AND DIAGNOSIS

(75) Inventors: Chih-Chau L. Kuan, Redmond; Shih-Jong J. Lee, Bellevue; Seho Oh, Mukilteo; Larry A. Nelson, Bellevue; Dayle G. Ellison, Redmond; Florence W. Patten, Issaquah, all of WA (US)

(73) Assignee: Neopath, Inc., Redmond, WA (US)

( * ) Notice: Under 35 U.S.C. 154(b), the term of this patent shall be extended for 0 days.

(21) Appl. No.: 09/006,457

(22) Filed: Jan. 13, 1998

(51) Int. Cl.[7] .............. G06K 9/00; G02B 21/26; G01N 33/48
(52) U.S. Cl. .............. 382/133; 359/391; 436/63
(58) Field of Search .............. 382/128, 133, 382/134; 356/39; 359/368, 391; 436/46, 63; 250/461.2; 705/1, 400, 500

(56) References Cited

U.S. PATENT DOCUMENTS

| 3,699,336 | 10/1972 | Ehrlich et al. | 250/461.2 |
| 3,824,393 | 7/1974 | Brain | 250/222.1 |

(List continued on next page.)

OTHER PUBLICATIONS

Bacus et al., "Optical Microscope System For Standardized Cell Measurements and Analyses", *Applied Optics*, 26:16, pp. 3280–3293, Aug. 15, 1987.

Bartels et al., "A Self–Learning Computer Program for Cell Recognition", *ACTA Cytologica*, 14:8, pp. 486–494, Sep.–Oct., 1970.

Chow et al., "Robustness Test of an Incipient Fault Detector Artificial Neural Network", Department of Electrical and Computer Engineering, North Carolina State University, Raleigh, NC 27695–7911, pp. I–73–I–78, ©1991 IEEE.

Duda et al., "Fisher's Linear Discriminant", *Pattern Classification and Scene Analysis*, pp. 114–121.

Dytch et al., "An Interactive Microcomputer–Based System for the Quantitative Analysis of Stratified Tissue Sections", *Analytical and Quantitative Cytology and Histology*, 9:1, pp. 69–78, Mar. 1987.

(List continued on next page.)

*Primary Examiner*—Amelia Au
*Assistant Examiner*—Mehrdad Dastouri
(74) *Attorney, Agent, or Firm*—Hans I. Sun; Emil Moffa; George Leone

(57) ABSTRACT

A method and apparatus for optimizing biological and cytological specimen screening and diagnosis. A slide review process is recommended for cytological specimen screening to identify abnormal sub-populations for further review and also diagnosis by a human expert. An automated screener processes a cytological specimen. Using a slide score generated by the automated screener, a slide review process using a slide score classification is determined. The recommendation of slide review processes improves overall performance of the screening process as measured by sensitivity to abnormal specimens, and at the same time reduces the work load of a human reviewer. The system also effectively and smoothly integrates the process of initial screening of the specimen with the process of further review of the specimen and final diagnosis of the specimen.

8 Claims, 16 Drawing Sheets

U.S. PATENT DOCUMENTS

| | | | |
|---|---|---|---|
| 3,916,176 | 10/1975 | Alien et al. | 382/133 |
| 4,045,655 | 8/1977 | Suzuki et al. | 377/10 |
| 4,097,845 | 6/1978 | Bacus | 382/134 |
| 4,129,854 | 12/1978 | Suzuki et al. | 382/134 |
| 4,150,360 | 4/1979 | Kopp et al. | 382/133 |
| 4,175,860 | 11/1979 | Bacus | 356/39 |
| 4,210,419 | 7/1980 | Castleman | 436/46 |
| 4,213,036 | 7/1980 | Kopp et al. | 382/133 |
| 4,296,373 | 10/1981 | Angel et al. | 324/71.1 |
| 4,513,438 | 4/1985 | Graham et al. | 382/134 |
| 4,523,278 | 6/1985 | Reinhardt et al. | 382/133 |
| 4,596,464 | 6/1986 | Hoffman et al. | 356/336 |
| 4,672,559 | 6/1987 | Jansson et al. | 382/128 |
| 4,690,521 | 9/1987 | Saccomanno | 359/368 |
| 4,700,298 | 10/1987 | Palcic et al. | 382/128 |
| 4,741,043 | 4/1988 | Bacus | 382/129 |
| 4,761,075 | 8/1988 | Matsushita et al. | 356/39 |
| 4,807,979 | 2/1989 | Saccomanno et al. | 359/368 |
| 4,833,382 | 5/1989 | Gibbs | 318/640 |
| 4,907,158 | 3/1990 | Kettler et al. | 700/58 |
| 4,965,725 | 10/1990 | Rutenberg | 382/224 |
| 5,000,554 | 3/1991 | Gibbs | 359/393 |
| 5,031,099 | 7/1991 | Kettler | 382/133 |
| 5,072,382 | 12/1991 | Kamentsky | 382/133 |
| 5,073,857 | 12/1991 | Peters et al. | 382/133 |
| 5,086,476 | 2/1992 | Bacus | 382/133 |
| 5,172,418 | 12/1992 | Ito et al. | 382/132 |
| 5,218,645 | 6/1993 | Bacus | 328/133 |
| 5,235,522 | 8/1993 | Bacus | 702/19 |
| 5,257,182 | 10/1993 | Luck et al. | 382/224 |
| 5,268,966 | 12/1993 | Kasdan | 382/133 |
| 5,287,272 | 2/1994 | Rutenberg et al. | 382/224 |
| 5,313,532 | 5/1994 | Harvey et al. | 382/156 |
| 5,315,700 | 5/1994 | Johnston et al. | 345/502 |
| 5,352,613 | 10/1994 | Tafas et al. | 436/63 |
| 5,361,140 | 11/1994 | Hayenga et al. | 358/446 |
| 5,428,690 | 6/1995 | Bacus et al. | 382/128 |
| 5,473,706 | 12/1995 | Bacus et al. | 382/133 |
| 5,544,650 | 8/1996 | Boon et al. | 600/309 |
| 5,561,556 * | 10/1996 | Weissman | 359/396 |
| 5,574,594 | 11/1996 | Fowler et al. | 359/391 |
| 5,581,487 * | 12/1996 | Kelly et al. | 564/571.01 |
| 5,602,674 * | 2/1997 | Weissmann et al. | 359/393 |
| 5,627,442 | 5/1997 | Engelse et al. | 318/640 |
| 5,655,029 | 8/1997 | Rutenberg et al. | 382/133 |
| 5,677,966 | 10/1997 | Doerrer et al. | 382/128 |
| 5,715,082 | 2/1998 | Saccomanno et al. | 359/391 |
| 5,740,270 | 4/1998 | Rutenberg et al. | 382/133 |
| 5,786,320 | 7/1998 | Hause et al. | 430/320 |
| 5,797,130 * | 8/1998 | Nelson et al. | 705/11 |
| 5,835,620 * | 11/1998 | Kaplan et al. | 382/133 |
| 5,939,278 * | 8/1999 | Boon et al. | 435/7.23 |

OTHER PUBLICATIONS

Enslein et al., "Augmented Stepwise Discriminant Analysis Applied to Two Classification Problems in the Biomedical Field", *Computers and Biomedical Research* 2, 568–581 (1969).

Kurman et al., "Part 1: Specimen Adequacy" and "Part 2: Descriptive Diagnoses", *The Bethesda System for Reporting Cervical/Vaginal Cytologic Diagnoses*, Springer–Verlag, pp. 4–81.

Lee et al., "A Processing Strategy for Automated Papanicolaou Smear Screening", ©The International Academy of Cytology, *Analytical and Quantitative Cytology and Histology*, 14:5, pp. 415–425, Oct. 1992.

McAulay et al., "Robust Aircraft Classification Using Moment Invariants, Neural Network, and Split Inversion Learning", Wright State University, Dept. of Computer Science and Engineering, Dayton, OH 45435, Abstract, II A–941.

Patten, Jr., Stanley, "Diagnostic Cytopathology of the Uterine Cervix", vol. 3, 2nd, revised edition, *Monographs in Clinical Cytology*, pp. 10–15.

Serra, J., *Image Analysis and Mathematical Morphology*, pp. 372–423, Academic Press, 1982.

Smith, Warren J. "Image Evaluation", *Modern Optical Engineering: The Design of Optical Systems*, McGraw–Hill Book Company, 1966, pp. 308–325.

Tanaka et al., "Automated Cytologic Screening System (CYBEST Model 4): an Integrated Image Cytometry System", *Applied Optics*, 26:16, pp. 3301–3307, Aug. 15, 1987. Copyright ©1987 by the Optical Society of America.

Tou et al., p. 20 and "Chapter 3: Pattern Classification By Distance Functions", *Pattern Recognition Principles*, pp. 75–109, Addison–Wesley Publishing Company, 1974.

Weber et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987 IEEE.

Wied et al., "Expert Systems as Classifiers in Diagnostic Cytopathology", IEEE/Ninth Annual Conference of the Engineering in Medicine and Biology Society, pp. 1915–1917, ©1987 IEEE.

Wied et al., "Expert System Design Under Uncertainty of Human Diagnosticians", IEEE/Eighth Annual Conference of the Engineering in Medicine and Biology Society, pp. 757–760, ©1986 IEEE.

Wied et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Zhou et al., "A Statistical–Heuristic Feature Selection Criterion for Decision Tree Induction", *IEEE Transactions on Pattern Analysis and Machine Intelligence*, 13:8, pp. 834–841, Aug. 1991, ©1991 IEEE.

* cited by examiner

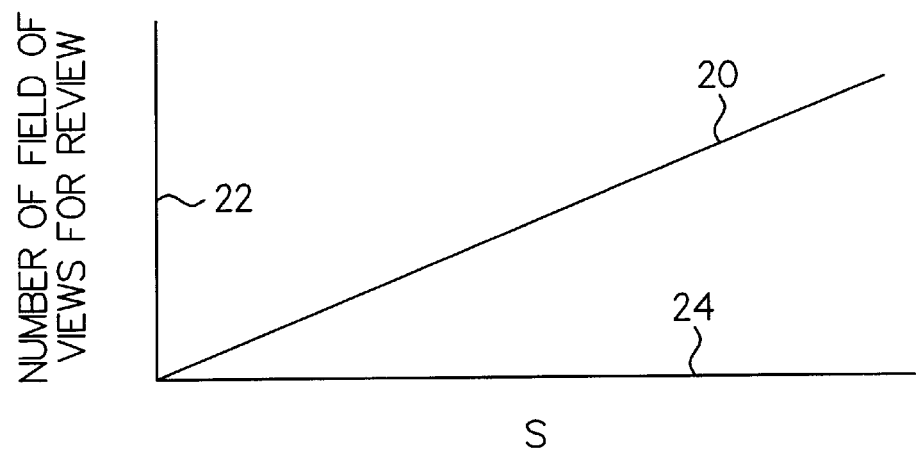
_Fig_ 2A
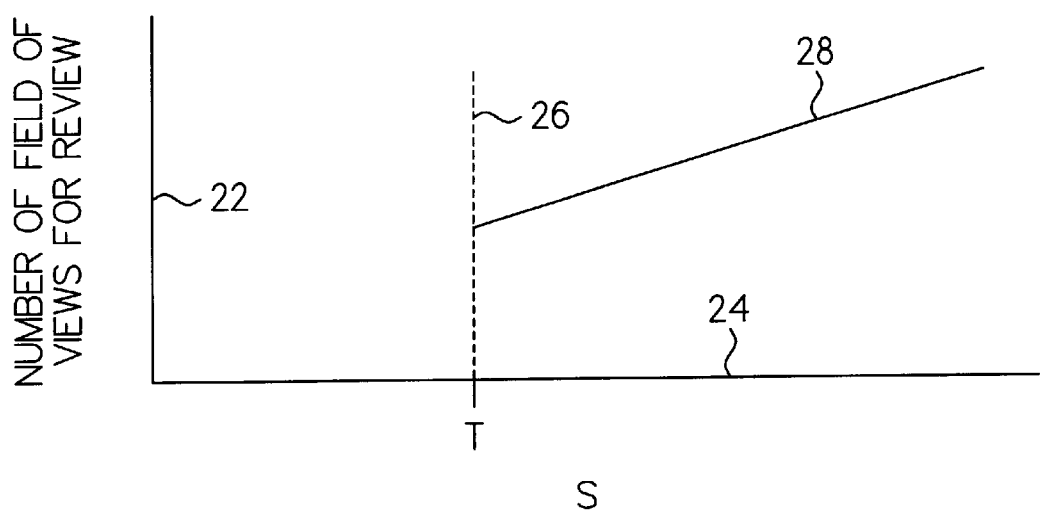
_Fig_ 2B

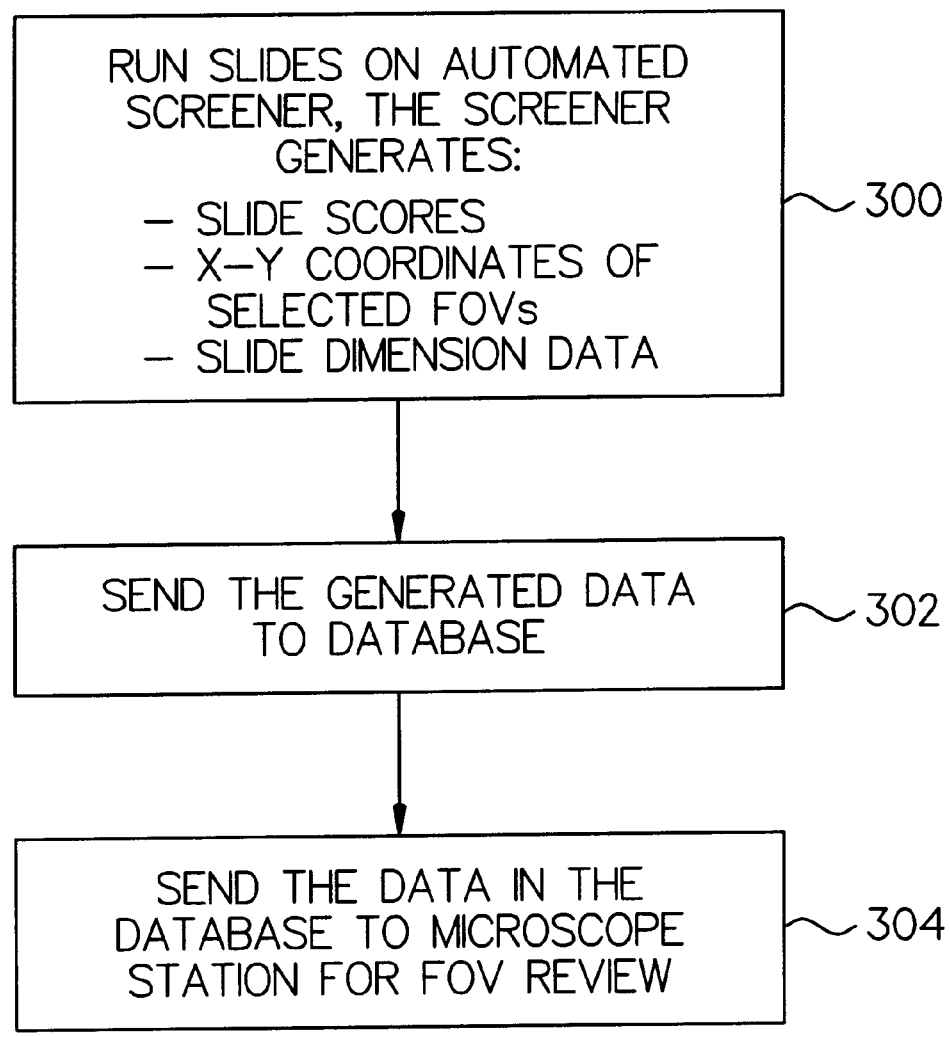
Fig_6

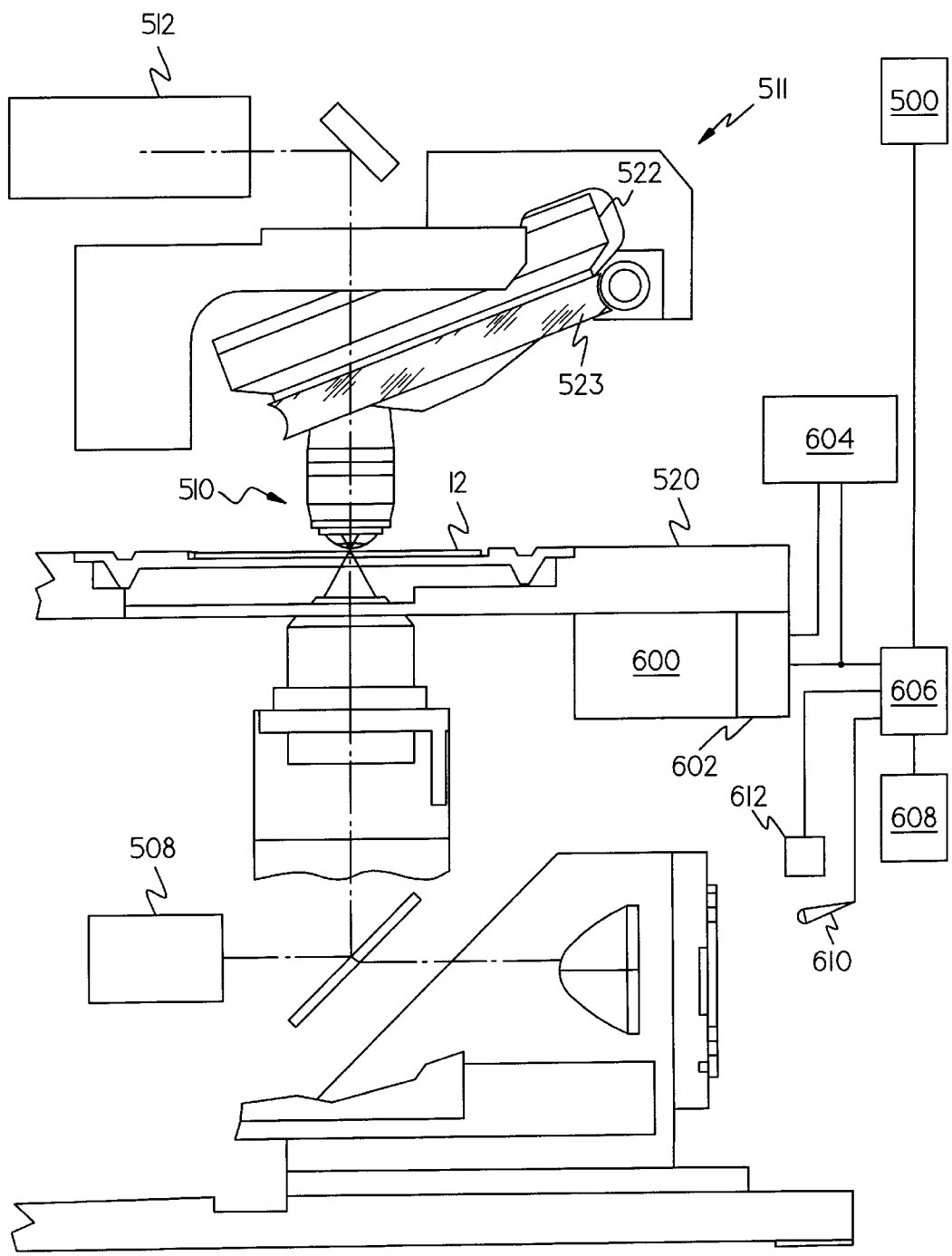
Fig_7C

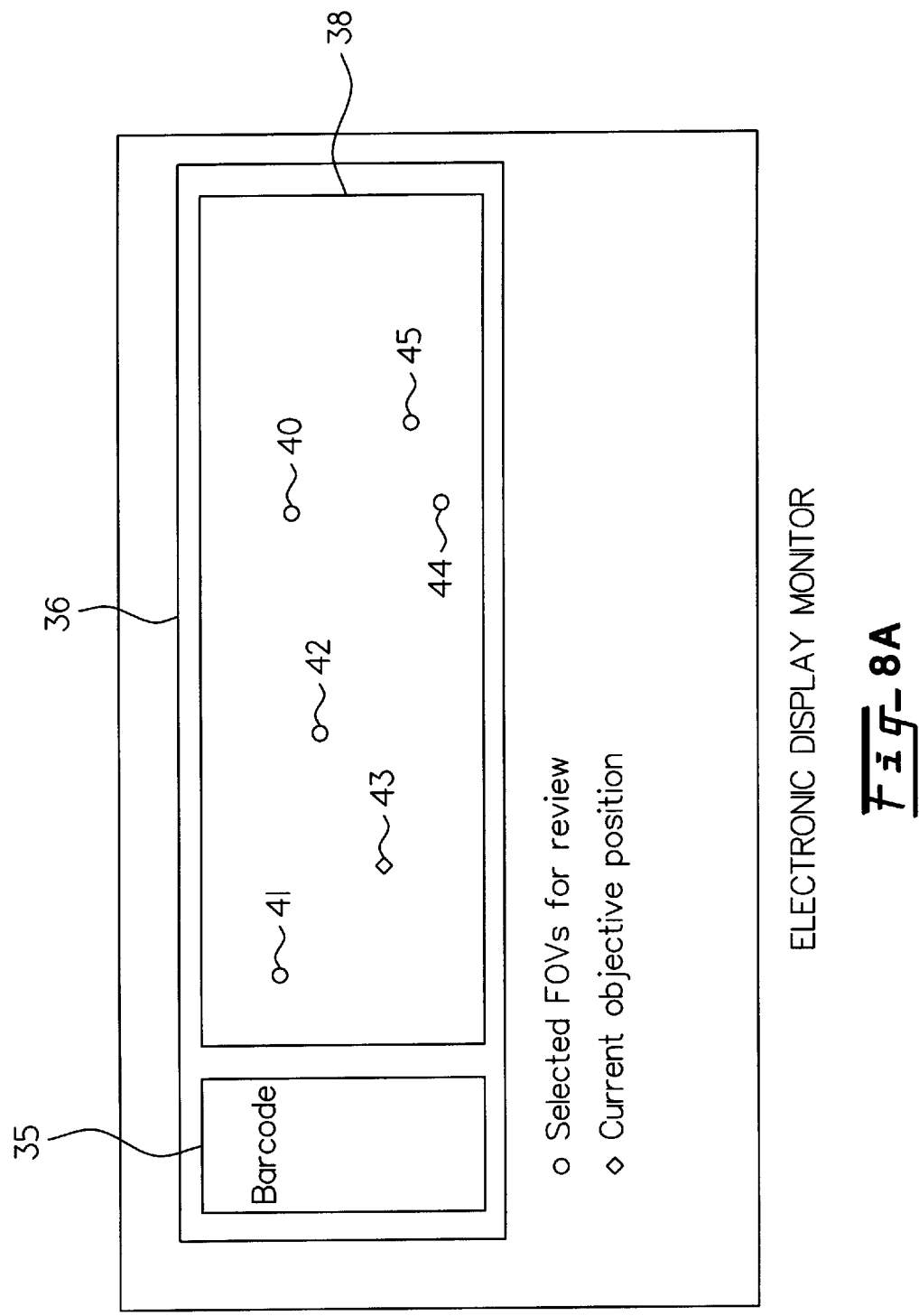

o Selected FOVs for review

METHOD AND APPARATUS FOR OPTIMIZING BIOLOGICAL AND CYTOLOGICAL SPECIMEN SCREENING AND DIAGNOSIS

FIELD OF THE INVENTION

The invention relates to a method and apparatus for cytological and biological specimen screening and diagnosis, and more particularly to a method and apparatus for cytological and biological specimen screening and diagnosis based on a slide score and a field of view score from an automated specimen screener.

BACKGROUND OF THE INVENTION

Automated biological and cytological specimen screeners, such as the AutoPap® 300 available from NeoPath Inc. of Redmond, Wash., quantitatively evaluate biological and cytological samples. These automated screeners utilize computer based imaging to evaluate biological and cytological samples such as Pap smears. Automated screeners interact with medical experts, such as cytologists and pathologists, by providing useful information to assist the expert in the identification of abnormal cases and in making a final diagnosis. These systems identify potential abnormal specimens and recommend further review by human cytologists and pathologists. The cytologist or pathologist then diagnoses the potential abnormal specimen. The cytologist or pathologist provides the final diagnosis of the potentially abnormal specimen.

An abnormal sub-population comprises those specimens from a set of specimens to be screened that are abnormal. Given a set of specimens comprising normal and abnormal, two methods are commonly used by automated screeners to assist medical experts in identifying the abnormal sub-population.

The first method employs a system that screens a slide and attempts to identify suspicious objects or cells. The system attempts to identify suspicious objects or cells as those that satisfy a set of predetermined criteria of potential abnormality. Then the system acquires images for further review by human experts. The system selects a subset of objects within each specimen based on the object detection results for further image review by the cytologist or pathologist. This first method allows the expert to avoid reviewing the remaining areas of each slide if the review result of the selected images does not reveal any abnormality.

This first method has many disadvantages. For example, reviewers must review many selected images for every specimen even if the specimen is clearly normal by any measurement. Furthermore, image review of the selected images in a significant percentage of cases is inconclusive. Therefore, the reviewer must resort to examining the specimen microscopically. This first method only performs measurement and recognition of individual cells or objects and does not consider factors such as: the contextual information between objects on the same slide, the global characteristics of the slide such as the staining level and the relationship between the slides of a population under screening. This first method does not provide a test for or information regarding specimen sampling adequacy. This first method does not consider the slide to slide variation problem within a slide set to be screened.

The second method computes a slide score or specimen score. The slide or specimen score is defined as a likelihood of abnormality, based on all the quantitative measurements of the slides, including overall cell detection results, contextual information of the specimen and even the patient risk measurement of the specimen, among others. The second method then determines whether the slide should be reviewed by a human expert by applying a predetermined threshold to the score. The threshold is determined by ranking all slide scores and selecting a score value that enables a certain percentage, e.g., 50%, of higher score slides to be selected for review. The second method selects a subset of all the slides based on the scores for further human review. The goal of the selection is to select a subset of slides that contains all the abnormals of the original population. By doing so, slide review of the remaining slides is no longer needed and the remaining slides may be reported as normal.

The second method allows for effective selection of abnormal slides for review based on the slide score. To facilitate human review of the potential abnormal material on a biological specimen, what is needed is information directing a level of review needed to minimize a false negative ratio while lowering cost.

However, information is needed concerning the location of potential abnormal material residing on the specimen. Without location information, human reviewers still need to search the entire slide and may miss critical material detected by the automated device and dismiss the specimen as a false-positive case. By providing location information, a human reviewer may dismiss a normal slide after reviewing the selected "most suspicious areas" and determining the slide to be a "false-positive". The second method directs review by a human reviewer thereby improving the sensitivity of human review and the efficiency of review process. This can significantly reduce the workload of the human reviewer.

SUMMARY OF THE INVENTION

The invention provides a method and apparatus for optimizing biological and cytological specimen screening and diagnosis. The invention recommends a slide review process for cytological specimen screening to identify abnormal sub-populations for further review and also diagnosis by a human expert. The invention processes a cytological specimen with an automated screener. Using a slide score generated by the automated screener, the invention determines a slide review process using a slide score classification. The method of the invention improves the overall performance of the screening process as measured by sensitivity to abnormal specimens, and at the same time reduces the work load of the human reviewer. The method of the invention also effectively and smoothly integrates the process of initial screening of the specimen with the process of further review of the specimen and final diagnosis of the specimen.

BRIEF DESCRIPTION OF THE DRAWINGS

FIGS. 2A, 2B, 2C and 2D show graphs of a number of areas selected from a specimen for review versus slide score determined by the invention.

FIG. 6 shows a flow chart of a process to provide data for FOV review.

FIGS. 7A, 7B and 7C show an embodiment of the automated screener of the invention.

FIG. 8A shows a sample display on the monitor.

DETAILED DESCRIPTION OF THE PREFERRED EMBODIMENT

Figure 1:
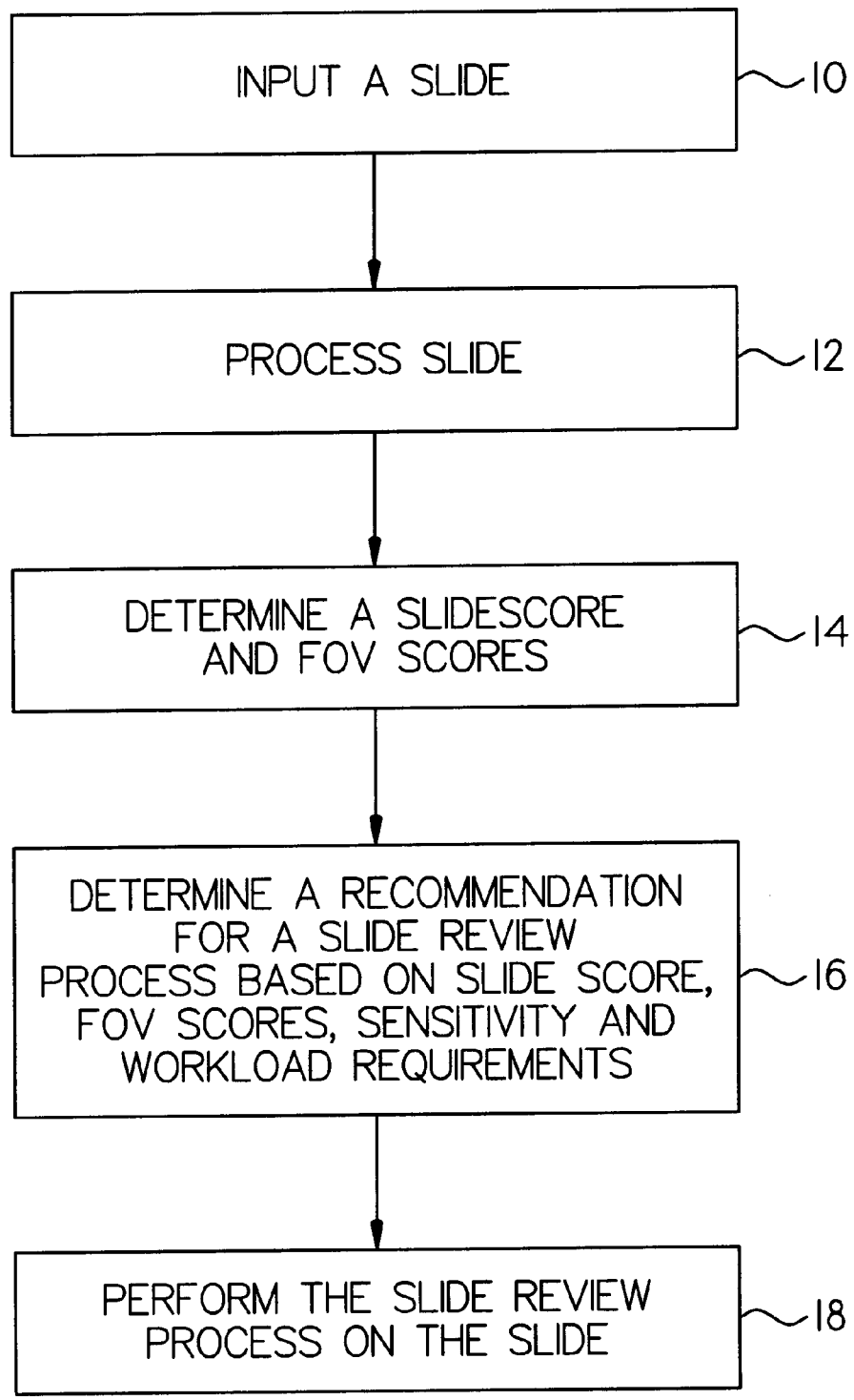
FIG. 1 shows a flow chart of the method of the invention for determining a recommendation for a slide review process.

Refer now to FIG. 1 which shows a flow chart of the method of the invention for determining a recommendation for a slide review process. The process begins in step 10 by inputting a slide into the system. In step 12, an automated screening device, such as the AutoPap from Neopath of Redmond, Washington, processes the slide. In step 14, during slide processing, the automated screener computes a slide score S. S represents an overall likelihood of slide abnormality. Those skilled in the art will recognize that the slide score S may also represent factors for other slide conditions such as specimen adequacy and quality of preservation.

In one embodiment of the invention, the automated screener computes a slide score S according to the methods described in applicant's U.S. Pat. No. 5,740,269, issued Apr. 14, 1998 to Oh et al., entitled A METHOD AND APPARATUS FOR ROBUST BIOLOGICAL SPECIMEN CLASSIFICATION where slide scoring is calculated based on accumulated slide features. In this embodiment, the automated screener computes the slide score S using a function of quantitative accumulated slide measurements, or slide features, that provide a global indication of the likelihood of the slide abnormality.

In one embodiment of the invention S is a function of slide measurements from an automated biological inspection system such as the AutoPap from Neopath of Redmond, Washington. The slide scoring function may comprise a linear or more complicated mathematical mapping function such as Fisher's Linear Discriminant functions, a binary decision tree or probabilistic decision tree.

In an alternative method, the automated screener uses the slide score S computed based on slide measurements and features to compute a second slide score that is adjusted to the slide abnormality prevalence probability. The automated screener may implement the adjustment by the Baysian rule. In this embodiment, the resulting slide score S is a function of both slide quantitative measurements, or slide features, and a prior probability of specimen abnormality derived from the patient's clinical history.

In another alternate embodiment of the invention, the automated screener computes S as a function of slide measurements and a patient's clinical history. Another method of calculating a slide score S, S' is to use FOV scores. For example, S equals the mean of the field of view scores, FOV scores, H of the highest ranked FOVs. In one embodiment, H=3.

Also in step 14, the automated screener computes FOV scores $F_i$. $F_i$ represents a likelihood that an ith FOV contains abnormal cells or cell groups. A FOV, field of view, is a fixed-size area on a slide specimen that contains any arbitrary amount of material such as cells, cell groups, artifacts, or mucus, etc.

In one embodiment of the invention, the automated screener computes FOV scores from a single cell process score ($S_i$), a group process score ($G_i$), and a thick group process score ($T_i$) as independently detected by the respective processes. Each score represents the likelihood of a detected abnormality in a FOV. The FOV score is a function of ($S_i, G_i, T_i$). For example, in one embodiment, the functional relationship of these process is:

$$F_i = 1-(1-S_i)(1-G_i)(1-T_i), \text{ and } 0 \leq S_i, G_i, T_i \leq 1$$

For each object within a FOV detected by each process, the object score calculated by the automated screener using each process is evaluated from the measurement of the similarity to abnormality using the fuzzy tree, non-parametric Parzen estimation, or other probability estimation methods. In one embodiment of the invention, the automated screener employs the following processes to compute an FOV score: a single cell process for the atypicality and add-on classifiers, a group process for the abnormal group classifier and a thick group process for the abnormal thick group classifier.

In one embodiment of the invention, examples of these processes are disclosed in U.S. patent application to Paul S. Wilhelm et al., entitled APPARATUS FOR AUTOMATED IDENTIFICATION OF CELL GROUPINGS ON A BIOLOGICAL SPECIMEN which is a divisional of U.S. patent application No. 08/309,061, filed on Sep. 20, 1994; abandoned U.S. patent application No. 08/309,116, filed Sep. 20, 1994 to Michael G. Meyer et al. entitled APPARATUS FOR AUTOMATED IDENTIFICATION OF THICK CELL GROUPINGS ON A BIOLOGICAL SPECIMEN; U.S. Pat. No. 5,987,158, issued Nov. 16, 1999 to Michael G. Meyer et al. entitled APPARATUS FOR AUTOMATED IDENTIFICATION OF THICK CELL GROUPINGS ON A BIOLOGICAL SPECIMEN which is a continuation now abandoned U.S. patent application No. 08/309,116, filed on Sep. 20, 1994; and U.S. Pat. No. 5,987,498, issued Nov. 2, 1999 to Paul S. Wilhelm et al., entitled APPARATUS FOR AUTOMATED IDENTIFICATION OF CELL GROUPINGS ON A BIOLOGICAL SPECIMEN and are hereby incorporated by reference.

In one example embodiment, the automated screener may compute an FOV score in the following manner. A FOV on a specimen can contain an arbitrary number of cells as well as non-cellular material such as artifacts, mucus, or bacteria, etc. Therefore, the automated screener may detect varying numbers of single cells, groups and thick groups. When there are multiple objects in a FOV, the automated screener derives an overall score using a nonlinear or linear function from the scores of each object. If M represents the number of single cell objects in $i_{th}$ FOV and $S_{ij}$ represents the score of each single cell object, then:

$$S_i = \text{function of } (S_{i1}, S_{i2}, \ldots, S_{iM}), \text{ and } 0 \leq S_{ij} \leq 1$$

When the score is represented by probabilities, each object is not independent such that there is a correlation between each object. Using the above assumption, the score is:

$$S_i = 1-(1-S_{i1})^{b1}(1-S_{i2})^{b2} \ldots (1-S_{iM})^{b(M)}$$

where b1, b2, ... b(M) are the factors to adjust the result from the association. Alternatively, the following equation can also be used:

$$S_i = 1-[(1-S_{i1})(1-S_{i2}) \ldots (1-S_{iM})]^{b(M)}$$

where b(M) is the collective factor of the association between objects and the value is the function of M, where M is the number of the objects in the FOV.

The automated screener may compute the score from group $G_i$ and thick group $T_i$ in a similar fashion. A training data set can be used to provide estimation for the coefficients. Table A shows an example of coefficients to adjust a slide score S.

TABLE A

| M | B(M) |
|---|---|
| 1 | 1.0 |
| 2 | 0.935 |
| 3 | 0.835 |
| 4 | 0.655 |
| 5 | 0.520 |
| ≧6 | 2.6*<br>log(1 + M)/nlog6 |

B(M) is an adjusting factor for calculating $S_i$ from multiple $S_{ij}$. Therefore, $S_i$ does not linearly decrease with the number of objects M.

After determining a slide score S and FOV scores $F_i$, the invention determines a recommendation for a slide review process based on the slide score or the FOV scores in step 16. In one embodiment, the method may determine a recommendation as described below with reference to FIG. 3. The method of the invention completes in step 18 by performing the recommended slide review process on the biological specimen on the slide. The automated screener can assist with the slide review process. In one embodiment, the automated screener may further comprise an automated microscope coupled with a display to direct screening of selected FOVs for review, as described below with reference to FIG. 8A. In an alternate embodiment, the automated screener may provide a printed map of the slide marked with the location of selected FOVs for review, as described below with reference to FIG. 8B. In a second alternate embodiment, the automated screener may directly mark on the coverslip of the slide on the location of the selected FOVs.

The invention provides for several different methods for conducting slide screening based on a combination of slide scoring and FOV review. The decision of selecting a certain number of areas (FOV) from a specimen for directed review can be based on the slide's abnormal scores and FOV scores provided by a screening device which may comprise the automated screener.

Refer now to FIG. 2A which shows a graph of a number of areas selected from a specimen for review versus slide score. In FIG. 2A, the number of FOVs 22 selected for review is proportional to the slide score. A slide score S 24 represents the overall likelihood of slide abnormality. As the slide score S 24 increases, the number of FOVs 22 selected for review increases proportionately as shown by line 20. The automated screener selects the areas for review using the FOV scores. The automated screener first ranks each FOV of a specimen based on the FOV scores. The screener then selects the highest ranked FOVs for review.

In an alternative embodiment, the number of FOVs selected for review selected by the automated screener may be accomplished by the following method. Describing a score S, representing a likelihood, by probabilities, allows formulation of the function in terms of the probability. The automated screener then determines the maximum number of FOVs to review by comparing the FOV scores Fi and slide score S that satisfy the following conditions:

$$(1-F_1)(1-F_2)\ldots(1-F_k) < \alpha(1-S)$$

and $$(1-F_1)(1-F_2)\ldots(1-F_{k-1}) > \alpha(1-S)$$

where $\alpha$ is an adjusting factor. This method is derived from the constant conditional probability given the probability of a slide.

Therefore, when $F_i$ are high and the slide score is low, then the screener selects a small number of FOVs. However, if $F_i$ are low and the slide score is high, then the screener selects a high number of FOVs for review. Table B shows an example of a method of the invention used to determine the number of FOVs to review.

TABLE B

| Ex. of α, S, $F_i$:<br>S = 0.7, α = 0.1 | |
|---|---|
| i | $F_i$ |
| 1 | 0.6 |
| 2 | 0.5 |
| 3 | 0.4 |
| 4 | 0.3 |
| 5 | 0.3 |
| 6 | 0.2 |
| 7 | 0.2 |
| 8 | 0.1 |
| 9 | 0.1 |
| 10 | 0.1 |

So $(1-F_i)\ldots(1-F_9)=0.0305 > \alpha(1-S)=0.03$ and $(1-F_i)\ldots(1-F_9)(1-F_{10})=0.0274 < \alpha(1-S)=0.03$.

Therefore, K=10, and 10 FOVs are selected for further review. Those skilled in the art will recognize that other methods may be used to determine the number of FOVs to review.

Refer now to FIG. 2B which shows a graph of a number of areas of a specimen selected for review versus slide score determined using an alternate embodiment of the invention. In this embodiment, the automated screener selects a number of areas 22 of a specimen for review in proportion to the slide score, but only when the slide score S 24 exceeds a predetermined threshold T 26 as shown by line 28. Slides having a slide score S less than or equal to a predetermined threshold T are not subjected to FOV review and the automated screener classifies them as normal needing no further human review. In this embodiment, the automated screener sorts out slides that are clearly normal thereby reducing the number of slides for review by a human reviewer. In one embodiment, the automated screener determines the number of FOVs to review for slides having a slide score S greater than threshold T according to the method shown with respect to FIG. 2A, above.

Figure 2C:
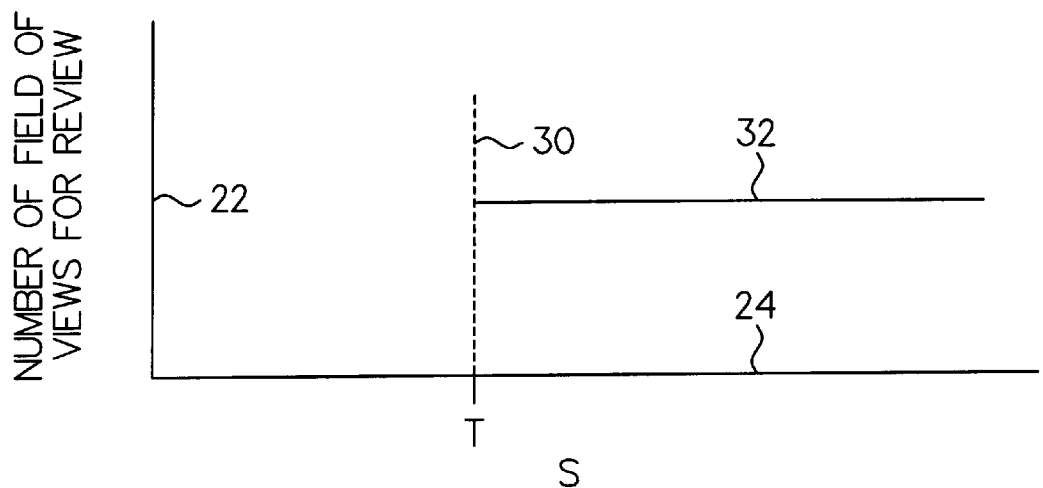

Refer now to FIG. 2C which shows a graph of a number of areas of a specimen selected for review versus slide score determined using a second alternate embodiment of the invention. Using this method, the automated screener selects a fixed number of areas of the specimen for review when the slide score 24 exceeds the predetermined threshold T 30 as shown by line 32. A typical fixed number of areas selected may be 10 or 15 FOVs. In one extreme case, if the number of areas fixed for review equals the total number of areas on the full specimen, the whole slide is selected for review.

Figure 2D:
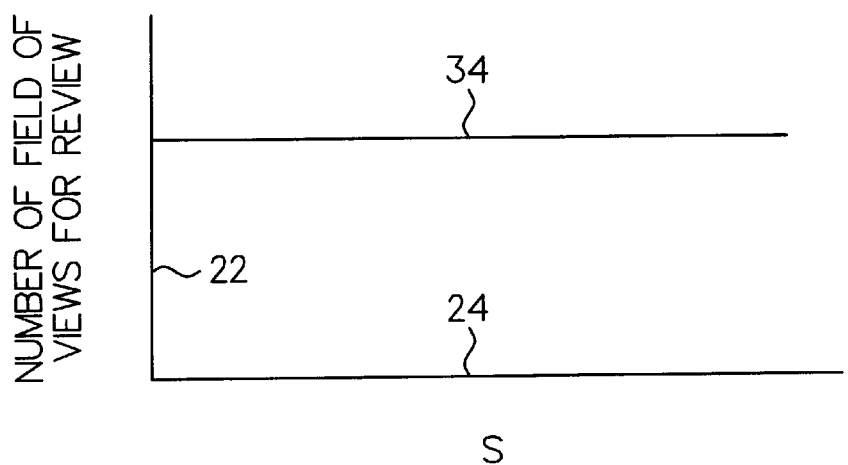

Refer now to FIG. 2D which shows a graph of a number of areas of a specimen selected for review versus slide score determined using a specialized embodiment of the invention. In FIG. 2D, the predetermined threshold T is set to the minimum possible slide score of the scoring process used to determine the slide score S 24. In this embodiment, all slides, independent of their respective slide scores, have a fixed number of areas selected for review as shown by line 34.

As shown above with respect to FIG. 1, an automated screener can determine a recommendation for a slide review process based on a slide score. An automated screener, such as the AutoPap, triages each slide to a different slide review process performed by cytotechnologists. The automated screener triages the slides using the computed slide scores S and S'. The screening processes vary from no review to fully review plus QC review. Each screening process has an associated FNR. Each screening process also has an associated cost that includes the time and other expense for performing one type of screening.

Figure 3:
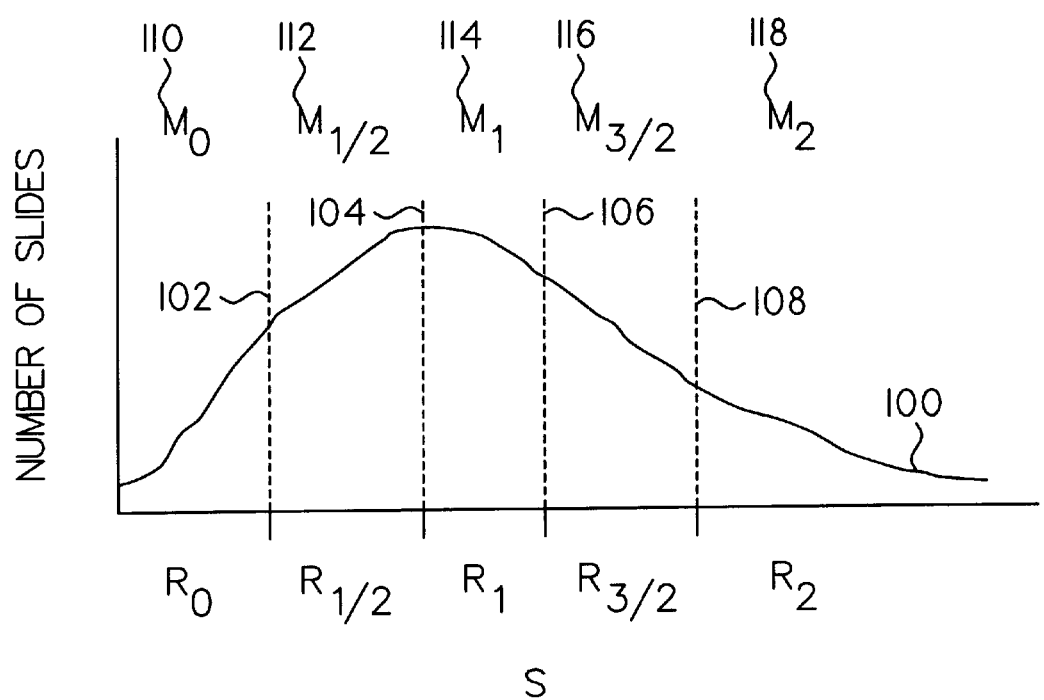
FIG. 3 shows a typical distribution of screening scores used to direct slide review.

Refer now to FIG. 3 which shows a typical distribution 100 of slide score S. In one embodiment of the invention, the automated screener may employ a series of threshold scores 102, 104, 106, 108 to triage slides into one of five slide review processes 110, 112, 114, 116, 118. Those skilled in the art will appreciate that the number of slide review processes may vary. In this example embodiment, the slide review processes may comprise the following types of review:

$M_0$: These slides require no review by a cytologist after AutoPap screening. The screener signs out slides assigned to this review process as normal. $f^0$ is the false negative density over the whole range of slide score percentiles for no review. $FNR_0$ is the associated overall False Negative Ration, (FNR) of all slides in the score region of no review. $C_0$ is the associated cost for this review method per slide.

$M_{1/2}$: Only selected FOVs require review by a cytologist after screening by a biological specimen screener. The review result determines if further review/diagnosis is required. Slides are signed out as normal if no abnormal cell is found in the FOVs. Otherwise full screening of the whole slide is required. $f^{1/2}$ is the false negative density over the whole range of slide score percentiles using this review mode. $FNR_{1/2}$ is the associated overall FNR of all slides reviewed by FOV only. $C_{1/2}$ is the associated cost for this review method per slide. Alternatively, the $M_{1/2}$ review method determines that only the slides falling into this slide score S range and having a slide score S' greater than a predetermined threshold, T, the selected FOVs require review. S' is calculated as a mean of the highest H FOV scores. In one embodiment H=3 or 5. If S'<T then the slide requires no review like $M_0$.

$M_1$: The slide requires full screening by a cytologist. $f^1$ is the false negative density over the whole range of slide score percentiles using this review mode. $FNR_1$ is the associated FNR of this slide review process. $C_1$ is the associated cost for this review method per slide.

$M_{3/2}$: The slide requires full screening by a cytologist. If no abnormality is found, the cytologist must review selected FOVs to confirm the diagnosis. $f^{3/2}$ is the false negative density over the whole range of slide score percentiles using this review mode. $FNR_{3/2}$ is the associated FNR for this review method. $C_{3/2}$ is the associated cost for this review method per slide.

$M_2$: The slide requires full screening by a cytologist. If no abnormality is found, the slide is subject to further independent QC review of the entire slide. $f^2$ is the false negative density over the whole range of slide score percentiles using this review mode. $FNR_2$ is the associated FNR after screening twice. $C_2$ is the associated cost for this review method per slide.

In general, the relationships of the false negative densities of the review modes is: $f^0 > f^{1/2} > f^1 > f^{3/2} > f^2$. The relationships of the associated costs of each review mode per slide is: $C_0 < C_{1/2} < C_1 < C_{3/2} C_2$.

In a clinical laboratory, the performance of the process of reviewing cytological specimen can be characterized by two critical parameters: the overall FNR and the average cost of reviewing a slide. Current lab practice for screening consists of 100% manual screening and 10% random selection QC. Individual laboratory's FNR $F_1$, based on current practice may be computed using statistics from each individual laboratory. Typically, laboratories have an FNR in the range of 5% ~40%.

With respect to FIG. 3, the lab screening process can be customized to an individual laboratory by adjusting the configuration parameters to calculate the percentages of slides, ranked by slide score, for different modes of slide screening. That is, the lab will determine and adjust $R_0$, $R_{1/2}$, $R_1$, $R_{3/2}$ and $R_2$ to achieve a desired performance. In one embodiment of the invention, the process recommendation method is configured to achieve a minimum FNR and to minimize cost that can satisfy the FNR criteria.

$R_0$, $R_{1/2}$, $R_1$, $R_{3/2}$ and $R_2$ represent the percentages of slides assigned to each review mode, where $R_0 + R_{1/2} + R_1 + R_{3/2} + R_2 = 1$.

The overall FNR of using the automated screener can be modeled by the following equation: $F = FNR_0 + FNR_{1/2} + FNR_1 + FNR_{3/2} + FNR_2$
where $$FNR_0 = \int_0^s f^0(q)dq, \; FNR_{1/2} = \int_t^s f^{1/2}(q)dq,$$

$$FNR_1 = \int_u^t f^1(q)dq, \; FNR_{3/2} = \int_v^u f^{3/2}(q)dq,$$

$$FNR_2 = \int_1^v f^2(q)dq,$$

and
$R_0 = s$, $R_{1/2} = t-s$, $R_1 = u-t$, $R_{3/2} = v-u$, $R_2 = 1-v$.
The composite operating cost of using the automated screener to screen slides may be modeled by the following equation:

$$C = C_0 R_0 + C_{1/2} R_{1/2} + C_1 R_1 + C_{3/2} R_{3/2} + C_2 R_2.$$

The optimal condition to achieve a minimum FNR and to minimize cost may then be determined as follows. The variable q represents the slide score percentile of a representative slide population, where $0 \leq q \leq 1$.

$$FNR_0 = \int_0^s f^0(q)dq, \; FNR_{1/2} = \int_s^t f^{1/2}(q)dq,$$

$$FNR_1 = \int_t^u f^1(q)dq, \; FNR_{3/2} = \int_u^v f^{3/2}(q)dq,$$

$$FNR_2 = \int_2^1 f^2(q)dq,$$

and
$R_0 = s$, $R_{1/2} = t-s$, $R_1 = u-t$, $R_{3/2} = v-u$, $R_2 = 1-v$.
To minimize the operating cost and satisfy the false negative rate constraint FNR<an allowed FNR, the method determines $R_0$, $R_{1/2}$, $R_1$, $R_{3/2}$, and $R_2$ to minimize the overall cost C. The overall cost comprises a false negative cost and operational cost. The false negative cost is the cost associated with not detecting an abnormal specimen. The overall cost is given by the following equation:

$$C = \lambda_1(F_0 + F_{1/2} = F_1 + F_{3/2}F_2) + \lambda_2(C_0 R_0 + C_{1/2}R_{1/2} + C_1 R_1 + C_{3/2}R_{3/2} + C_2 R_{2l})$$

where $\lambda_1$, $\lambda_2$ are positive numbers.
The cost minimization conditions are given by the following equations:

$$\frac{\partial \text{Cost}}{\partial s} = \frac{\partial \text{Cost}}{\partial t} = \frac{\partial \text{Cost}}{\partial u} = \frac{\partial \text{Cost}}{\partial v} = 0, \text{ and}$$

$$\frac{f^0(s) - f^{1/2}(s)}{C_{1/2} - C_0} = \frac{f^{1/2}(t) - f^1(t)}{C_1 - C_{1/2}}$$

$$= \frac{f^1(u) - f^{3/2}(u)}{C_{3/2} - C_1}$$

$$= \frac{f^{3/2}(v) - f^2(v)}{C_2 - C_{3/2}}.$$

These user defined criteria can be specified by a given set of parameters, such as an allowable upper limit for the FNR, cost of reviewing an entire slide $C_1$, etc. The parameters $f^0$, $f^{1/2}$, $f^1$, $f^{3/2}$, $f^2$ are determined using a clinical study of the automated screener based on a representative slide population. In addition, techniques such as linear programming can optimize a model with these constraints.

Figure 4A:
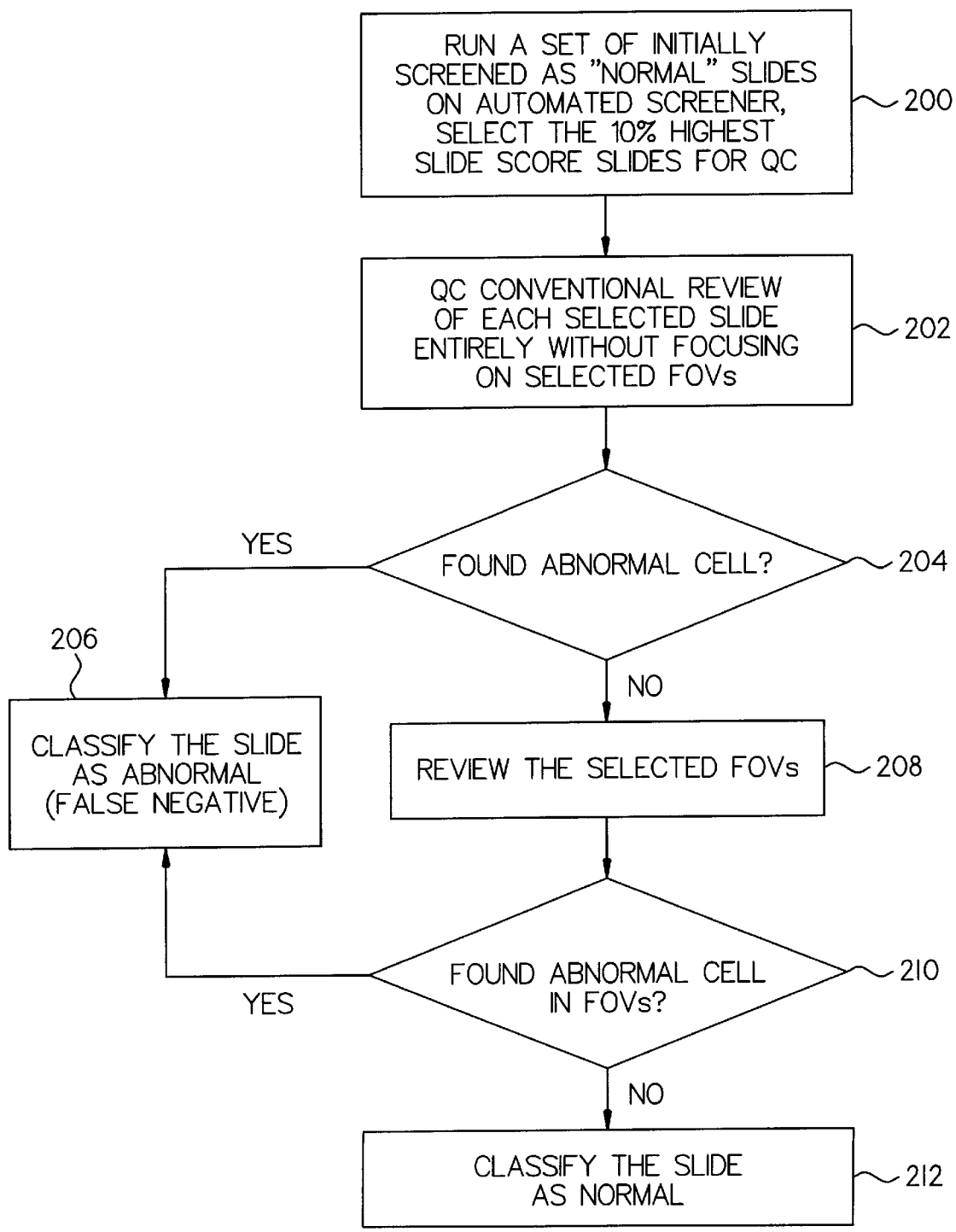
FIGS. 4A, 4B and 4C show modes of operation of the invention for QC review of slides scored by an automated screener.
Figure 4B:
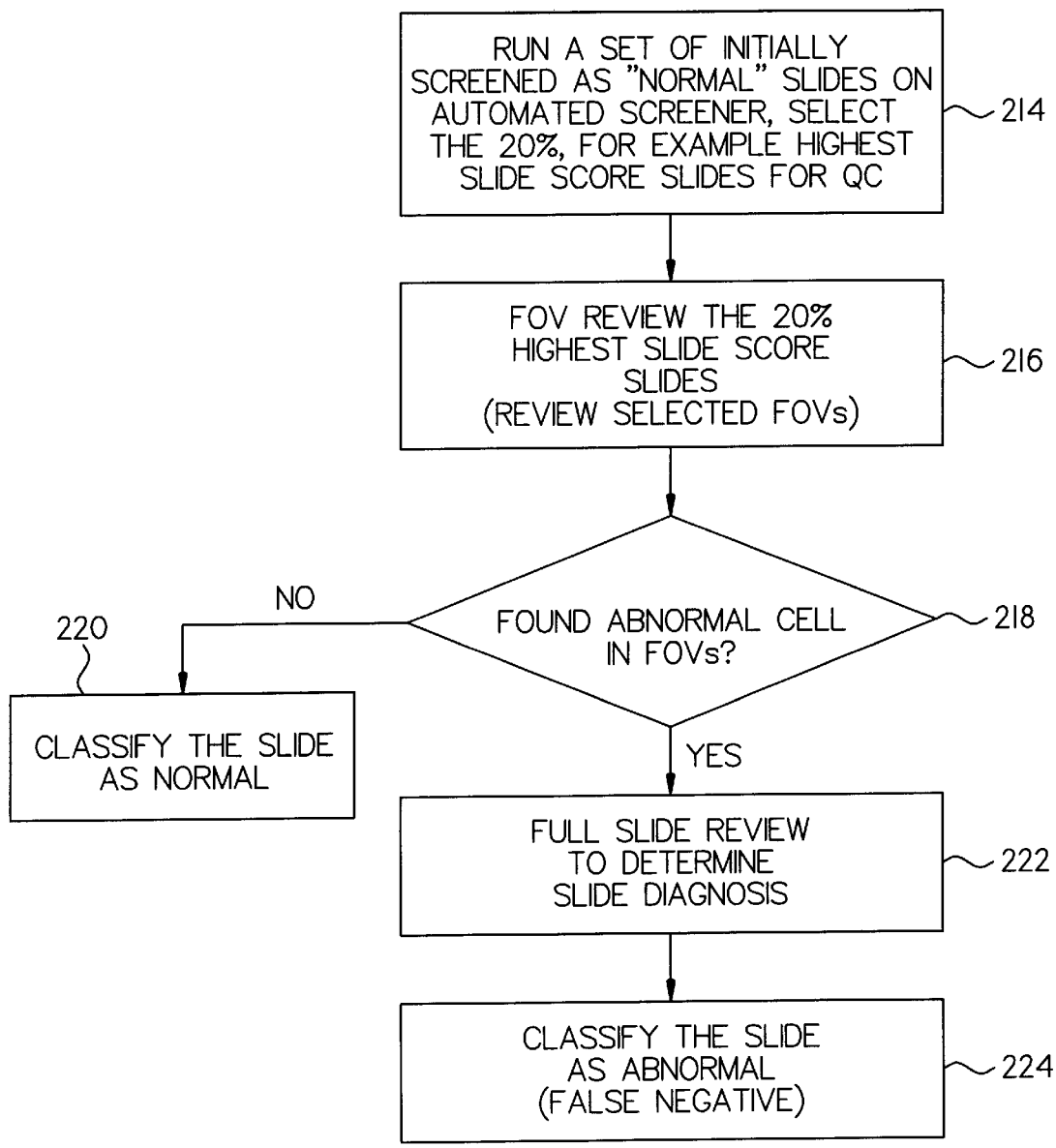
Figure 4C:
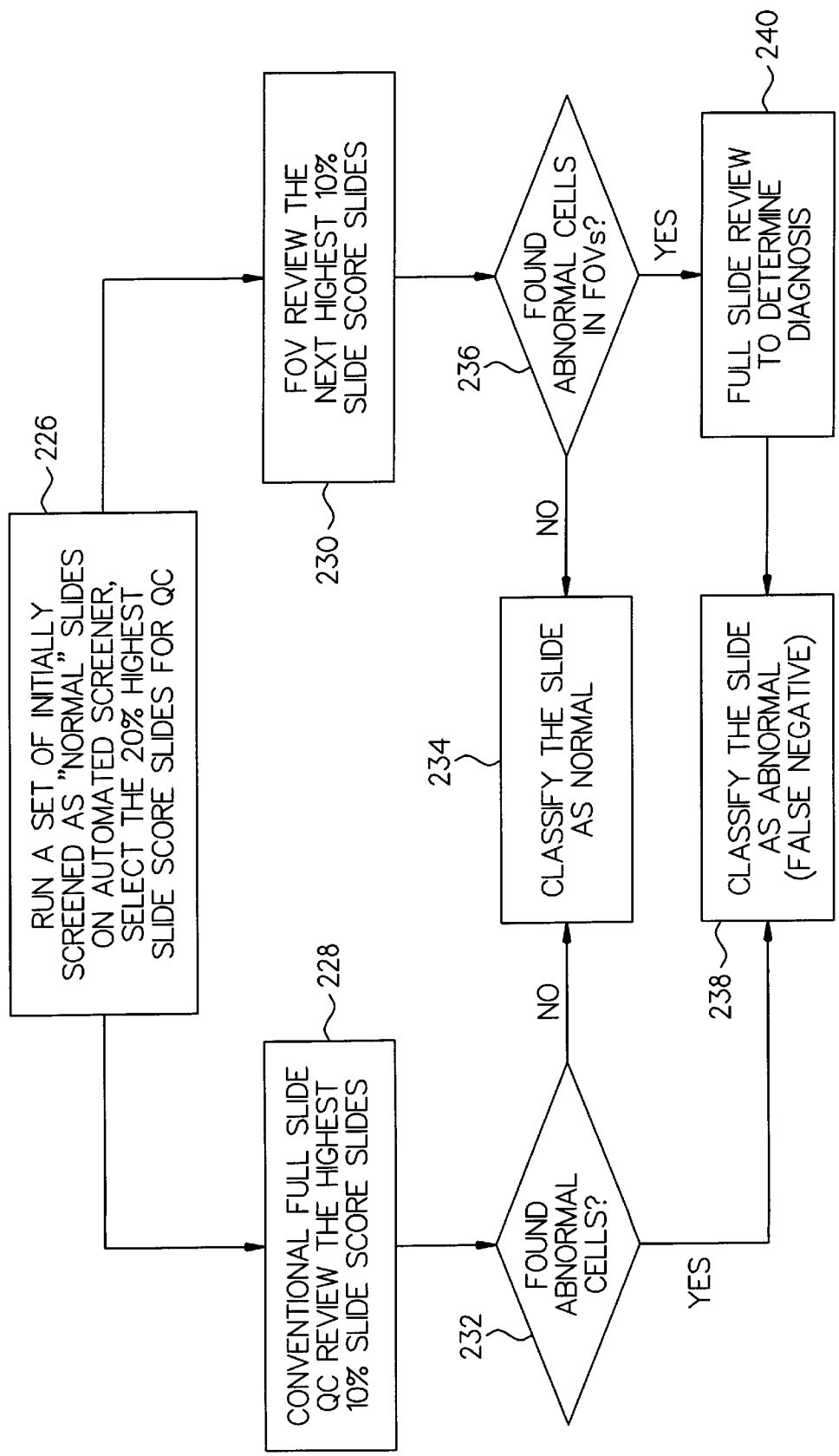

The method of the invention includes other models or modes of operation using various slide review processes. FIGS. 4A, 4B and 4C show modes of operation of the invention for QC review of slides scored by an automated screener. For example, FIG. 4A shows a mode of operation using a slide review process for reviewing a set of slides initially screened as normal. In step 200, the slides having a slide score in the top 10% are selected for QC conventional review. The slides have a QC conventional review performed without focusing on selected FOVs in step 202. If the QC conventional review finds an abnormal cell in step 204, the method terminates in step 206 by classifying the slide as abnormal or a false negative. If the QC conventional review does not find an abnormal cell in step 204, the method then proceeds to step 208 to review the selected FOVs. If an abnormal cell is found in the selected FOVs in step 210, then the process terminates as above in step 206 by classifying the slide as abnormal or a false negative. Otherwise, the process completes in step 212 by classifying the slide as normal.

FIG. 4B shows another mode of operation using a second slide review process for reviewing a set of slides initially screened as normal on an automatic screener. The process begins in step 214 by selecting the slides having slide scores in the top 20% for QC. The process then performs an FOV review of the slides having scores in the highest 20% of slide scores. After reviewing the selected FOVs in step 216, the method checks to see if any abnormal cells were found in the selected FOVs in step 218. If no abnormal cells are found in the selected FOVs, the slide is classified as normal in step 220 and the process terminates. Otherwise, the slide undergoes a full slide review to determine a slide diagnosis in step 222. The process finishes by classifying the slide as abnormal or a false negative in step 224 if an abnormal cell was found in the selected FOVs in step 218.

FIG. 4C shows another mode of operation using two slide review processes. The process begins in step 226 by running a set of slides initially screened as normal on an automated screener. The method selects slides having scores in the top 20% for QC. The process continues to step 228 for slides having slide scores in the top 10%. A conventional full slide QC review is performed on these slides in step 228. In step 232, the method checks to see if the conventional full slide QC review found any abnormal cells. If not, the process terminates in step 234 by classifying the slide as normal. Otherwise, the process terminates in step 238 by classifying the slide as abnormal or a false negative. The method continues from step 226 to step 230 for slides having slide scores in the next 10%. An FOV review is performed on these slides in step 230. If the FOV review found any abnormal cells in step 236, the method continues to step 240 to perform a full slide review to determine a diagnosis in step 240. The method then terminates in step 238 by classifying the slide as abnormal or a false negative. If no abnormal cells were found in the FOVs in step 236, then the method completes in step 234 by classifying the slide as normal.

Figure 5A:
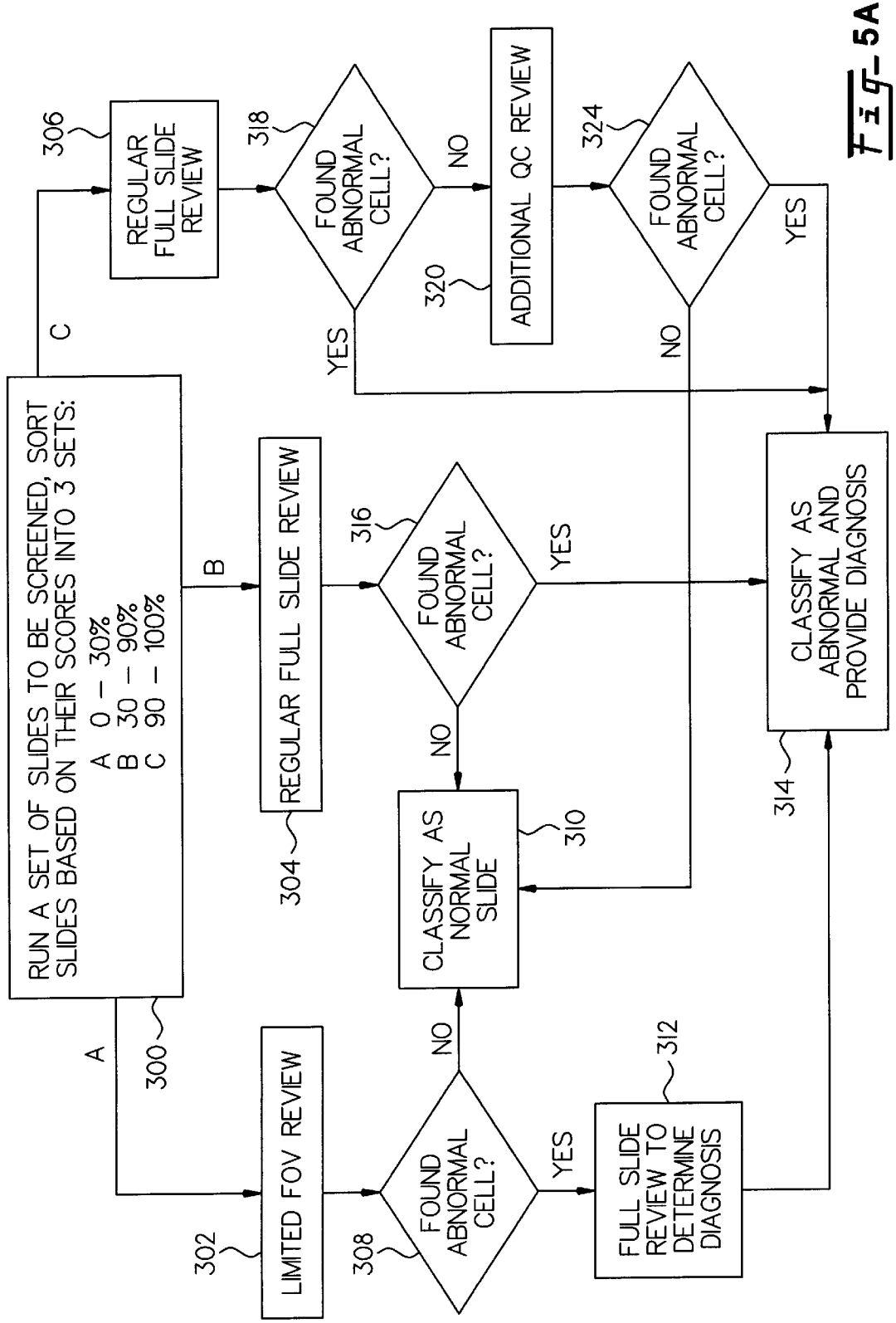
FIGS. 5A and 5B show a mode of operation of the present invention for primary screening and QC review.
Figure 5B:
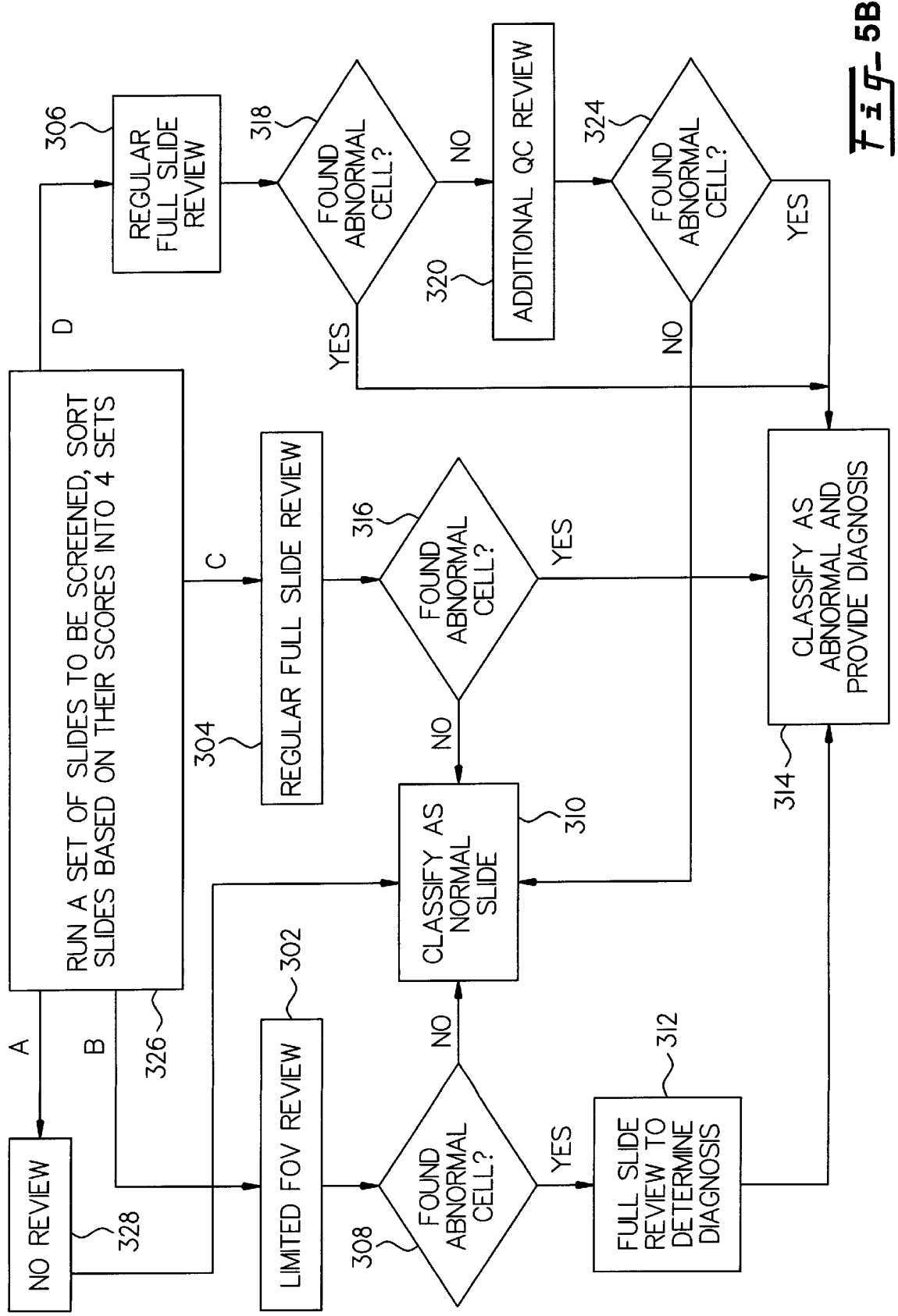

FIGS. 5A and 5B show a mode of operation of the present invention for primary screening and QC review. FIG. 5A shows a first embodiment of a method of the invention to determine a slide review process based on a slide score. The method begins in step 300 by running a set of slides to be screened through an automated screener. The method sorts the slides based on their slide scores into three sets of slides. The first set of slides have slide scores in the lowest 30%, the second set of slides have slide scores in the 30% to 90% range, and the third set of slides have slide scores in the top 10%.

The method sorts the slides having scores in the lowest 30% for a limited FOV review in step 302. The method sends slides having scores in the 30% to 90% range to step 304 for a regular full slide review. Slides having scores in the top 10% are sent for regular full slide review in step 306.

Slides sent for limited FOV review are checked for an abnormal cell in step 308. If no abnormal cells were found during limited FOV review, the method terminates in step 310 by classifying the slide as a normal slide. Otherwise, the method proceeds to step 312 to perform a full slide review to determine a diagnosis in step 312. The method then completes in step 314 by classifying the slide as abnormal and providing the diagnosis determined in step 312.

For slides sent for regular full slide review in step 304, the method checks to see if an abnormal cell was found in step 316. If no abnormal cell was found, then the method terminates in step 310 by classifying the slide as a normal slide. Otherwise, if an abnormal cell was found in step 316, the process terminates in step 314 by classifying the slide as abnormal and providing a diagnosis.

For slides having scores in the top 10% and sent for regular full slide review in step 306, the method checks to see if an abnormal cell was found during regular full slide review in step 318. If an abnormal cell was found, the process terminates in step 314 by classifying the slide as abnormal and providing a diagnosis. If no abnormal cell was found in step 318, the slide is sent for additional QC review in step 320. The method then checks to see if an abnormal cell was found during additional QC review in step 324. If no abnormal cell was found during additional QC review, then the method terminates in step 310 by classifying the slide as a normal slide. Otherwise, the process completes in step 314 by classifying the slide as abnormal and providing a diagnosis.

FIG. 5B shows a second embodiment of a method of the invention to determine a slide review process based on a slide score. FIG. 5B comprises the same slide review processes as FIG. 5A, but also provides for not performing a review of slides having scores in a predetermined range. The method begins in step 326 by sorting the slides based on their slide scores into four sets. The method sends the first group to step 328 for no review. The slides are classified as normal and the method ends in step 310. The other three groups are processes as shown above with reference to FIG. 5A.

Figure 5C:
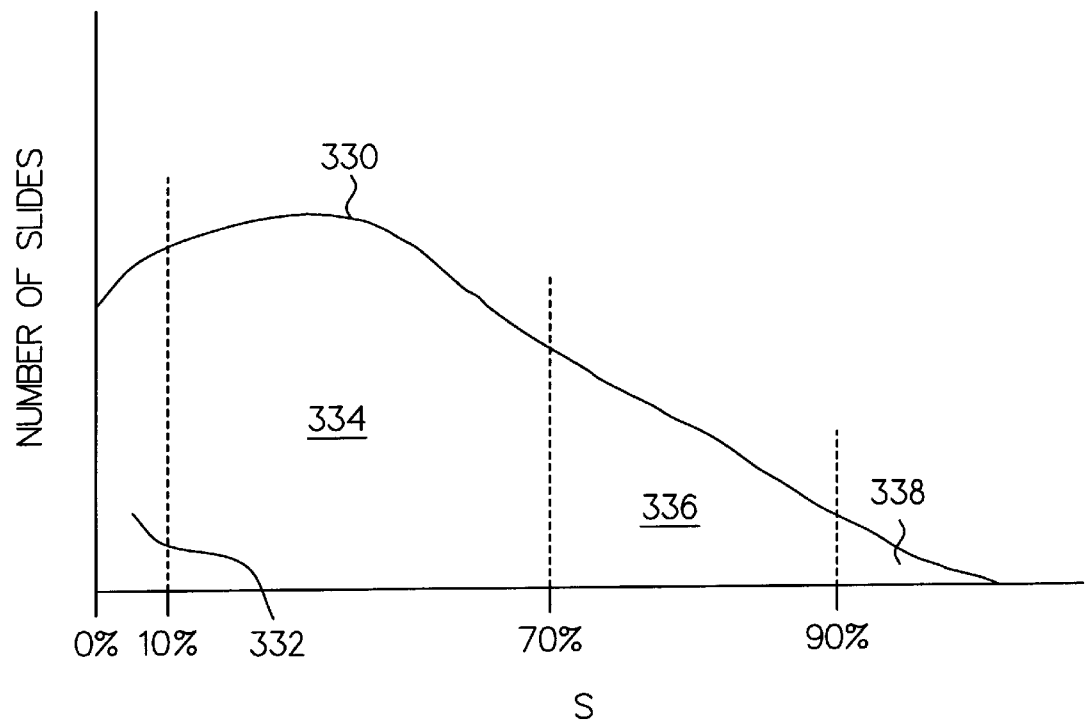
FIG. 5C shows an example slide score distribution.

Refer now to FIG. 5C, which shows an example slide score distribution 330. The invention may employ the slide score distribution 330 to assign slides to slide sets in a method to determine a slide review process based on a slide score such as shown in FIG. 5B. In one example embodiment, the slide score distribution may be divided into four predetermined ranges 332, 334, 336, 338. Each range 332, 334, 336, 338 may have an associated review process. For example, range 332 may comprise the lowest 10% of slide scores. Slides having scores in this range may be assigned to the no review set in FIG. 5B. Range 334 may comprise slide scores in the 10% to 70% range. Slides having scores in this range may be assigned to the regular full slide review range. Range 336 may comprise slide scores in the 70% to 90% range. Slides having scores in this range may be assigned to the limited FOV review range. Slides in this range may not require a regular full slide review since an abnormal cell may usually be detected in an FOV review. Range 338 may comprise slide scores in highest 10%. Slides having scores in this range may be assigned to the regular full slide review and an additional QC review.

Using the methods for directed slide screening described above, the invention provides for specific embodiments for different applications. These applications may comprise quality control and concurrent primary screening with quality control.

For example, the invention may provide quality control for rescreening slides classified as normal by an initial primary screening cytologist. The invention may be used to implement the following modes of operation for quality control for rescreening slides.

The first mode of operation is based on the slide score. The automated screener selects the 10% of slides having the highest slide score for full slide conventional review. When no positive is identified, the cytologist reviews selected FOVs for confirmation. The cytologist first looks at the entire slide and may find nothing of interest even though the automated screener classified the slide as "QC" review. The cytologist then reviews the FOVs selected by the automated screener and may find that something was missed on the first screen, or may conclude that the areas of interest are not significant and can classify the slide as normal. This mode of operation helps to ensure that a QC rescreen cytologist does not miss the cells the automated screener found suspicious. This mode also reduces search time required to find the suspicious cells.

The second mode of operation is also based on the slide score. The automated screener selects the 10% of slides having the highest slide scores for full slide conventional review. The automated screener selects the next highest 10% of slides for FOV review. This operation mode can increase the detection of false negative slides by FOV review with minimum additional time required for reviewing the FOVs.

The third mode of operation is based on the slide score. The automated screener selects a predetermined percentage, such as 20%, of slides for FOV review. Full slide rescreening is required when any abnormality found in the reviewed FOVs. This operation mode selects an enriched slide population for enriched FOV rescreening. This operational mode may reduce the workload required and be more effective than simply picking the top 10% slides for full rescreening. This mode can also be more cost-effective than a "rapid sample rescreen" method. The rapid sample rescreen method requires the QC reviewer to quickly review every (100%) initially screened normal slides in one to two minutes.

The invention also provides for concurrent primary screening and quality control for rescreening slides classified as normal by an initial primary screening cytologist. The invention may be used to implement the following modes of operation.

The first mode is based on the slide scores. The automated screener sorts slides into three different review modes: Limited FOV, review FOV $M'_{1/2}$ for lowest 30% of slides, where a maximum of five and an average of two to three FOVs will be selected and reviewed, regular full slide review $M_1$ (60% of slides) and full slide review plus QC review $M_2$ for top 10% of the slides. This review process is a specific case of the method described above with reference to FIG. 3 having less operational complexity. This mode allows for a review of every slide of a limited number of FOVs, e.g., 3–5, unless the slide is so clean that there is no cell having at least a minimum likelihood of abnormality. This review process can reduce users' psychological "black box" concerns and also discover any "unsatisfactory" slide. Also, detection of abnormal slides that have low scores and a low prevalence of abnormal cells can be improved by using the limited FOV review.

In the second mode, the automated screener sorts slides based on slide scores into four classifications: no-review (0–10% range), FOV review (70–90% range), full slide screen (10–70% range), full slide QC screen-and-FOV review (90–100% range). This review process provides for minimizing cost and a low FNR.

As discussed above with reference to step 18 of FIG. 1, the automated screener may assist with a slide review process by directed review of selected FOVs. The automated screener may use the slide coordinates of the selected FOV in different user interfaces to direct the reviewers to the selected FOV.

Figure 7A:
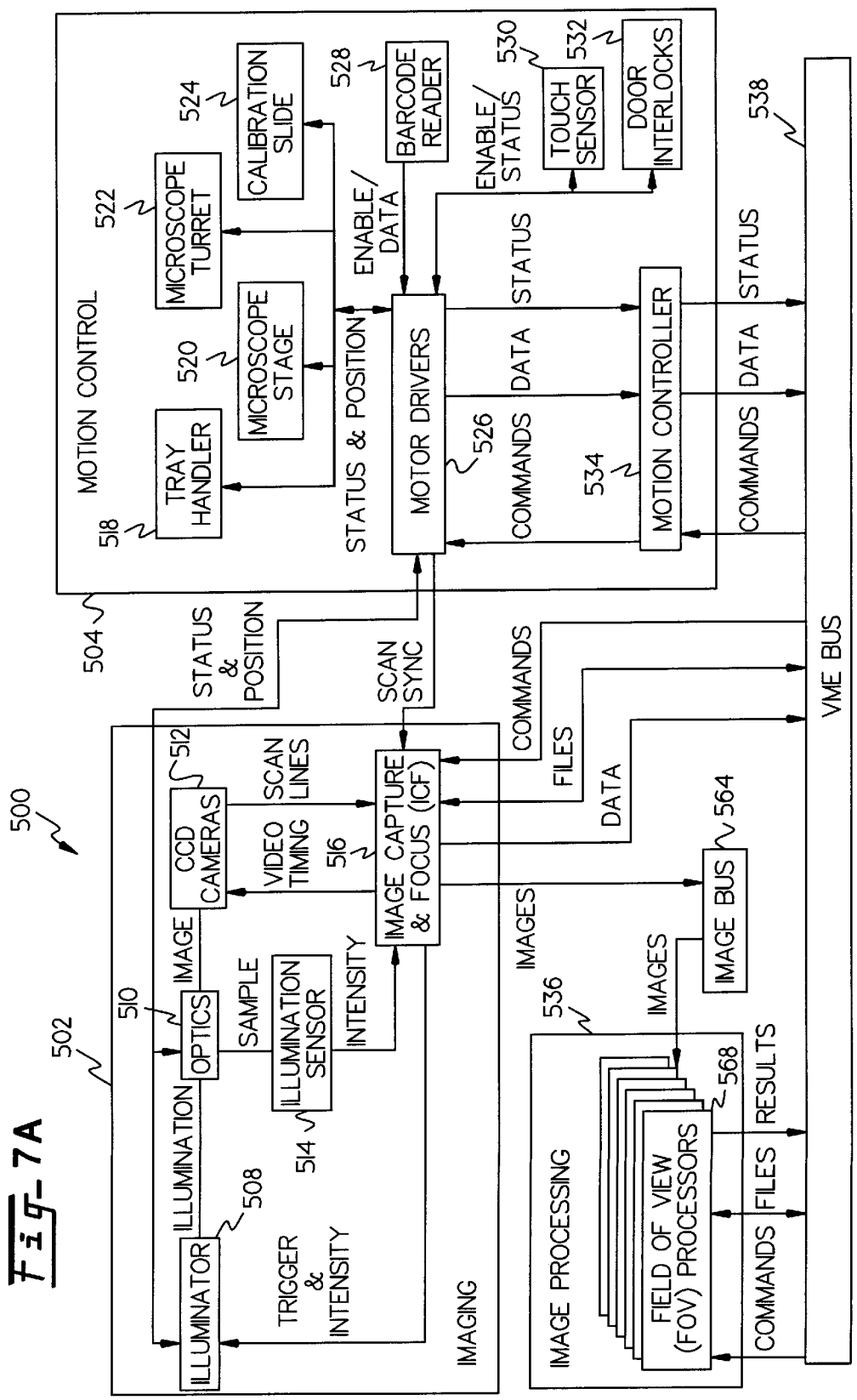
Figure 7B:
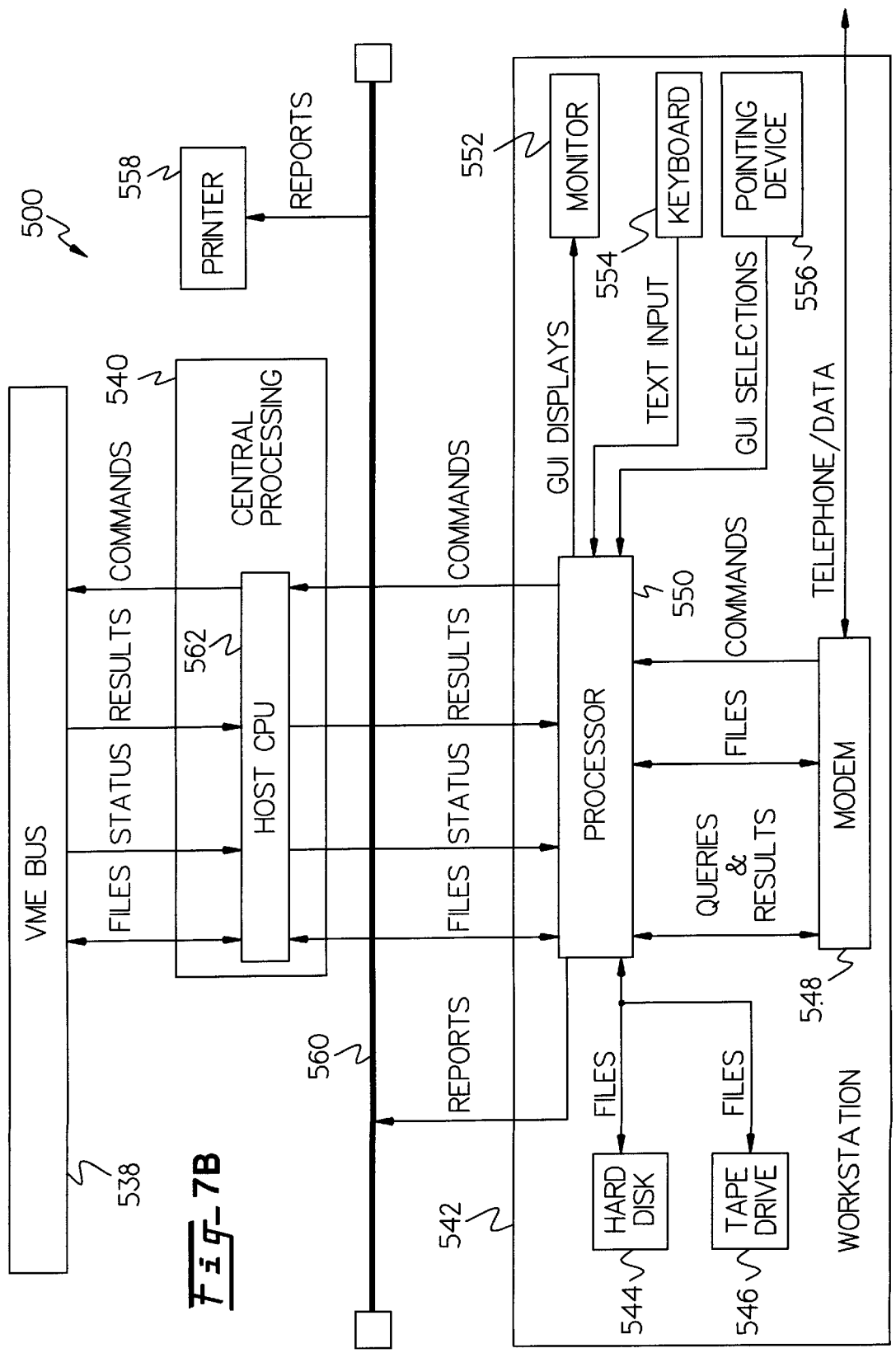

Refer now to FIGS. 7A, 7B and 7C which show an embodiment of the automated screener of the invention. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 (TM) CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a SUN SPARC CLASSIC (TM) workstation. A tape drive 546 is connected to the workstation 550 as well as a modem 548, a monitor 552, a keyboard 554, and a mouse pointing device 556. A printer 558 is connected to the ethernet 560.

The automated screener 500 provides X-Y coordinates of selected FOVs and slide dimension data in digital format to an automated microscope 511. The X-Y coordinates of selected FOVs and slide dimension data can be generated by the automated screener 500 and stored in the database along with the corresponding slide scores during slide processing. FIG. 6 shows a flow chart of a process employed in one embodiment of the invention by the automated screener to provide data for FOV review. The process begins in step 300 by running the slides on the automated screener. The automated screener generates slide scores, x-y coordinated coordinates of selected FOVs and slide dimension data. The generated data is sent and stored in a data base in step 302. During FOV review in step 304, the data in the data base is sent to an automated microscope or a microscope station to assist in locating the selected FOVs for review.

In one embodiment, the automated screener 500 may comprise a standard optical microscope 511 having X-Y location encoders 602 attached to a stage 520 and an electronic FOV position display 604. The location encoders 602 and display 604 are connected to a digital computer 606. One example device is the Pathfinder available from NeoPath, Inc., of Redmond, Wash., with a manual or motorized stage.

The location encoders 602 track the X-Y location of the current viewable FOV at which the objective is positioned. The computer 606 continuously acquires X-Y data from the location encoders 602 and updates the display 604. The display may comprise a small CRT or LED monitor that shows a schematic drawing of the slide 36, with or without coverslip edges 38, a barcode 35, the locations of target FOVs 40, 41, 42, 44, 45 and the current location of the objective 43 as shown in FIG. 8A.

To review the FOVs selected by the automatic screener, the computer downloads the stored slide dimension data, such as length, width and skew angle, and the FOV X-Y coordinates of each slide. The monitor 604 displays a drawing of the slide, X-Y locations of these FOVs to be reviewed, and the current stage X-Y location of the objective lens. FIG. 8A shows a sample display on the monitor 604. In one embodiment, the cytologist may use the displayed X-Y information to manually move the microscope stage to the targeted FOV X-Y locations to review the cellular material in that FOV and determine if any abnormal material is present. The cytologist may enter the result from reviewing each FOV using a computer keyboard 608 for storage and reporting a final diagnosis. Alternatively, the user may dictate the result for each FOV to a microphone 610. The digital computer 606 runs speech recognition software to convert voice commands, such as "normal", "abnormal" or associated diagnostic categories such as "LSIL", "HSIL", etc. into text data for display for the user to confirm, for storage and final reporting. In an alternate embodiment, the computer 606 may move the stage 520 using X-Y motors 600 from one FOV to the next. The cytologist may control the computer using a keyboard or a mouse 612.

Figure 8B:
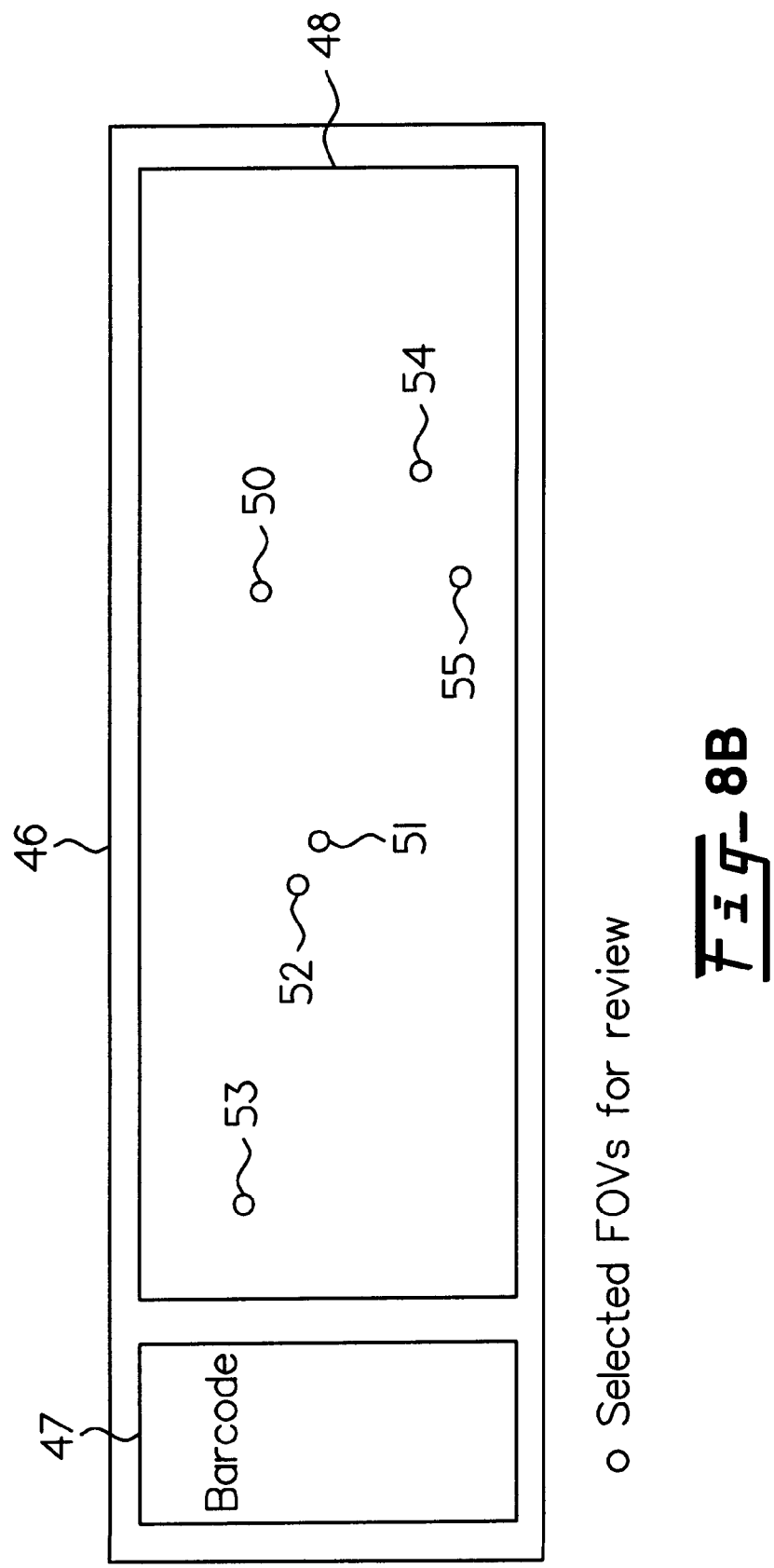
FIG. 8B shows a sample map of FOVs selected by the automated screener.

In an alternate embodiment, the automated screener may direct review of selected FOVs by providing a printed map (PapMap™) having the exact physical slide dimension with the selected FOVs marked. FIG. 8B shows a sample map of FOVs selected by the automated screener. The printed map 46 is based on the physical size measurements of a slide and coverslip provided by the automated screener, and can be generated by standard computer graphic software. The map 46 includes an outline of the coverslip 48, optional barcode 47 and may use circles 50, 51, 52, 53, 54, 55 encompassing the FOV to indicate the locations of the FOVs selected for the cytologist to review. In one embodiment, the map for each slide can be printed on regular paper or on transparent media such as static cling clear vinyl.

Cytotechnologists can overlay the actual slide on top of the printed map and correspondingly circle or dot the FOVs on the coverslip using a marker. The cytotech can then review the circled or dotted area under the optical microscope. If the map is printed on a transparent media such as static cling clear vinyl, the map can be cut out, aligned with the glass slide and pressed on to attach the map to the bottom of the glass slide directly. The slide can then be reviewed directly under the optical microscope. In one embodiment, the radius of the circles drawn on the map are 1,000μm to match the area covered by a 10× objective lens. The circles ensure review of the cells of interest and also focus the cytotech's attention on a small region.

In an alternate embodiment, a mechanical dotting device with an motorized stage and an ink injector controlled by a computer 606 can be used to put small, colored marks on the coverslip of a slide based on the stored slide dimension data and the FOV X-Y coordinates. The computer 606 controls the motorized stage and ink injector of the dotter. Slide data provided by the automated screener is transmitted to the computer from the database. The computer reads a slide bar code, uses the slide data to setup a slide by determining the slide edges and corner locations on the stage 520. To mark a selected FOV, the computer moves the slide to 1,000 μm left-lower spot of the FOV X-Y locations and injects a small amount of ink, for example, a spot radius of 0.5 mm or less on the coverslip. A cytologist may then review the ink marked slides using a regular optical microscope.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for determining thresholds for a plurality of slide review processes for use with an automated screening device comprising the steps of:

a) computing a review process cost associated with each slide review process of the plurality of slide review processes;

b) computing a sensitivity to abnormals associated with each slide review process; and c) computing an overall review rate from a review rate for each slide review process, wherein each review rate is affected by a threshold for the slide review process, wherein each threshold is selected to provide a review rate for each slide review process that minimizes a total cost and satisifies a minimum sensitivity constraint.

2. The method of claim 1 wherein the review process cost comprises a false negative cost.

3. The method of claim 1 wherein the review process cost comprises operational cost.

4. A method for determining a slide review process for screening and reviewing of a cytological specimen on a slide using an automated screening device, the method comprising the steps of processing the cytological specimen with the automated screening device to generate a slide score; classifying the slide score according to predetermined criteria to provide a slide score classification; and determining a slide review process from a plurality of slide review processes to perform on the cytological specimen based on the slide score classification; wherein the step of processing the cytological specimen with the automated screening device further comprises the step of generating a plurality of fields of view; wherein the step of processing the cytological specimen further comprises generating a plurality of field of view scores; wherein the step of processing the cytological specimen further comprises the steps of scoring a plurality of fields of view of the slide to provide a field of view score for each field of view of the plurality of fields of view; ranking the plurality of fields of view according to its field of view score; determining a number of fields of view to select for review; and selecting the highest ranked fields of view within that number for review; and wherein the step of determining a number of fields of view to select for review further comprises the steps of:

a) computing a k highest field of view score to satisfy the following conditions:

$$(1-F_1)(1-F_2) \ldots (1-F_k) < \alpha(1-S)$$

and $$(1-F_1)(1-F_2) \ldots (1-F_{k-1}) > \alpha(1-S)$$

where:
α is an adjusting factor;
$F_k$ is the field of view score of a kth highest field of view; and
S is the slide score; and b) selecting a plurality of fields of view having the k highest field of view scores for review.

5. A method for determining a slide review process for screening and reviewing of a cytological specimen on a slide using an automated screening device, the method comprising the steps of: processing the cytological specimen with the automated screening device to generate a slide score; classifying the slide score according to predetermined criteria to provide a slide score classification; and determining a slide review process from a plurality of slide review processes to perform on the cytological specimen based on the slide score classification; wherein the step of processing the cytological specimen with the automated screening device further comprises the step of generating a plurality of fields of view; wherein the step of processing the cytological specimen further comprises generating a plurality of field of view scores; wherein step of processing the cytological specimen further comprises the steps of: scoring a plurality of fields of view of the slide to provide a field of view score for each field of view of the plurality of fields of view; ranking the plurality of fields of view according to its field of view score; determining a number of fields of view to select for review; and selecting the highest ranked fields of view within that number for review; wherein the step of determining a number of fields of view to select for review further comprises the steps of:

a) determining if the slide score exceeds a predetermined threshold, and if it does not, selecting no fields of view for review; and b) if it does, computing a k highest field of view score to satisfy the following conditions:

$$(1-F_1)(1-F_2) \ldots (1-F_k) < \alpha(1-S)$$

and $$(1-F_1)(1-F_2) \ldots (1-F_{k-1}) > \alpha(1-S)$$

where:
α is an adjusting factor;
$F_k$ is the field of view score of a kth highest field of view; and
S is the slide score; and c) selecting a plurality of fields of view having the k highest field of view scores for review.

6. A method for determining a slide review process for screening and reviewing of a cytological specimen on a slide using an automated screening device, the method comprising the steps of:

a) processing the cytological specimen with the automated screening device to generate a slide score;

b) classifying the slide score according to predetermined criteria to provide a slide score classification;

c) determining a slide review process from a plurality of slide review processes to perform on the cytological specimen based on the slide score classification;

d) computing a review process cost associated with each slide review process of the plurality of slide review processes;

e) computing a sensitivity to abnormals associated with each slide review process; and f) computing a review rate for each slide review process, wherein the review rate for each slide review process is selected to minimize a total cost and satisfy a minimum sensitivity constraint.

7. The method of claim 6 wherein the review process cost comprises a false negative cost.

8. The method of claim 6 wherein the review process cost comprises operational cost.

* * * * *